(12) United States Patent
Tainsh et al.

(10) Patent No.: US 10,885,346 B2
(45) Date of Patent: Jan. 5, 2021

(54) METHOD, SYSTEM AND APPARATUS FOR SELECTING FRAMES OF A VIDEO SEQUENCE

(71) Applicant: CANON KABUSHIKI KAISHA, Tokyo (JP)

(72) Inventors: Mark Ronald Tainsh, Pymble (AU); Rajanish Calisa, Artarmon (AU); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 16/153,465

(22) Filed: Oct. 5, 2018

(65) Prior Publication Data
US 2019/0108402 A1 Apr. 11, 2019

(30) Foreign Application Priority Data
Oct. 10, 2017 (AU) .............................. 2017245322

(51) Int. Cl.
*G06K 9/00* (2006.01)
*G06T 7/246* (2017.01)
*G06T 7/60* (2017.01)
*G06K 9/62* (2006.01)
*H04N 5/232* (2006.01)

(52) U.S. Cl.
CPC ..... *G06K 9/00765* (2013.01); *G06K 9/00362* (2013.01); *G06K 9/00664* (2013.01); *G06K 9/00744* (2013.01); *G06K 9/6202* (2013.01); *G06T 7/246* (2017.01); *G06T 7/60* (2013.01); *H04N 5/232* (2013.01); *G06K 2209/27* (2013.01); *G06T 2207/10016* (2013.01); *G06T 2207/30196* (2013.01)

(58) Field of Classification Search
CPC ........... G06K 9/00765; G06K 9/00744; G06K 9/00664; G06K 9/00362; G06K 9/6202; G06K 2209/27; H04N 5/232; H04N 5/23229; H04N 5/23219; G06T 7/60; G06T 7/246; G06T 2207/10016; G06T 2207/30196
See application file for complete search history.

(56) References Cited

U.S. PATENT DOCUMENTS 7,330,566 B2 12/2008 Cutler
7,616,233 B2 * 11/2009 Steinberg ............... H04N 5/232
348/222.1
7,675,543 B2 * 3/2010 Jain ........................ G11B 27/28
348/169

(Continued)

FOREIGN PATENT DOCUMENTS

AU 2016277643 A1 7/2018

*Primary Examiner* — Wesley J Tucker
(74) *Attorney, Agent, or Firm* — Canon U.S.A., Inc. IP Division

(57) ABSTRACT

A method of selecting frames of a video sequence. Image data for a plurality of consecutive frames of the video sequence is captured using a camera. Frames from the plurality of consecutive frames where the camera is moving are identified using the captured image data, wherein each of the identified frames comprises a subject. A size of the subject captured in each of the identified frames is determined. The identified frames are selected by detecting that the camera is moving towards and with the subject based on the size of the subject within each of a plurality of the identified frames.

20 Claims, 14 Drawing Sheets

(56) References Cited

U.S. PATENT DOCUMENTS

| | | | |
|---|---|---|---|
| 8,319,834 B2 | 11/2012 | Jain et al. | |
| 8,830,330 B2 | 9/2014 | Jain et al. | |
| 8,886,012 B2 | 11/2014 | Morimoto et al. | |
| 9,319,860 B2* | 4/2016 | Tanaka | H04W 4/90 |
| 9,567,078 B2* | 2/2017 | Zang | G05D 1/0038 |
| 10,372,994 B2* | 8/2019 | Chan | G06K 9/00744 |
| 2007/0067723 A1 | 3/2007 | Hosoda et al. | |
| 2008/0303913 A1* | 12/2008 | Mertens | H04N 5/232 348/222.1 |
| 2011/0286731 A1 | 11/2011 | Gallagher et al. | |
| 2013/0293741 A1* | 11/2013 | Nishi | H04N 5/225 348/222.1 |
| 2014/0176708 A1* | 6/2014 | Ramakrishnan | G06K 9/00771 348/143 |
| 2014/0267801 A1* | 9/2014 | Grundmann | H04N 5/2329 348/208.1 |
| 2016/0011004 A1* | 1/2016 | Matsumoto | G01C 21/16 702/96 |
| 2016/0092561 A1* | 3/2016 | Liu | G06F 16/7837 386/230 |
| 2016/0163022 A1 | 6/2016 | Peleg et al. | |
| 2016/0253560 A1* | 9/2016 | Tokutake | G06F 3/0412 382/103 |

* cited by examiner

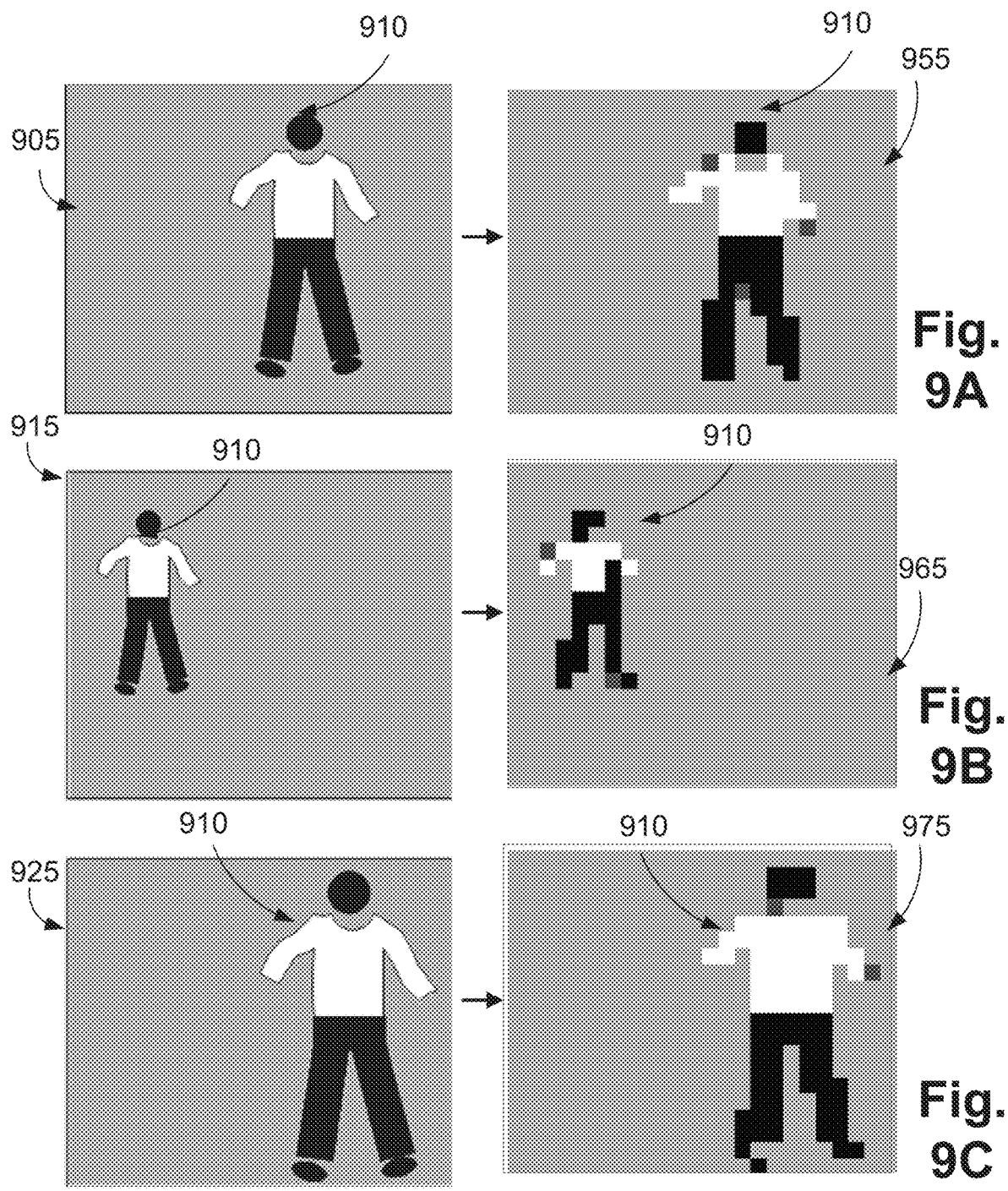

METHOD, SYSTEM AND APPARATUS FOR SELECTING FRAMES OF A VIDEO SEQUENCE

REFERENCE TO RELATED PATENT APPLICATION(S)

This application claims the benefit under 35 U.S.C. § 119 of the filing date of Australian Patent Application No. 2017245322, filed Oct. 10, 2017, hereby incorporated by reference in its entirety as if fully set forth herein.

TECHNICAL FIELD

The present disclosure relates generally to digital video processing and, in particular, to a method, system and apparatus for selecting frames of a video sequence based on subject detection. The present disclosure also relates to a computer readable medium having recorded thereon a computer program for selecting frames of a video sequence based on subject detection.

BACKGROUND

Video is an effective method of capturing a scene or an unfolding event. People often capture videos for birthday parties, weddings, travel and sports events. Unlike still images, video images have an advantage of capturing evolving, unstructured events, such as particular natural facial expressions, human interactions and human actions (e.g. playing, performance activities, sporting activities). It is often desirable to select segments of a video sequence to generate a shorter version of the video sequence which contains the most memorable highlight sections. It is also often desirable to remove dull, repetitive or poor quality sections of the sequence. Further, it is desirable to select video highlights automatically.

One method of automatically selecting video highlights is to post-process the video sequence on a personal computer. Post-processing the video sequence on a personal computer has the advantage that considerable processing power is available, so that methods that use image analysis of the individual frames of the video sequence are possible. It is also possible to use additional video metadata that the camera may capture and record the metadata along with the video images. The video metadata may include data from gyro sensors, face detection algorithms, luminance maps, camera settings, and exposure sensors. However, standard video formats do not include such video metadata, so proprietary video formats may be required to exchange data between a camera and a personal computer.

SUMMARY

It is an object of the present invention to substantially overcome, or at least ameliorate, one or more disadvantages of existing arrangements.

According to one aspect of the present disclosure, there is provided a method of selecting frames of a video sequence, the method comprising:

capturing image data for a plurality of consecutive frames of the video sequence using a camera;

identifying frames from the plurality of consecutive frames where the camera is moving using the captured image data, wherein each of the identified frames comprises a subject;

determining a size of the subject captured in each of the identified frames; and selecting the identified frames by detecting that the camera is moving towards and with the subject based on the size of the subject within each of a plurality of the identified frames.

According to another aspect of the present disclosure, there is provided an apparatus for selecting frames of a video sequence, the apparatus comprising:

means for capturing image data for a plurality of consecutive frames of the video sequence using a camera;

means for identifying frames from the plurality of consecutive frames where the camera is moving using the captured image data, wherein each of the identified frames comprises a subject;

means for determining a size of the subject captured in each of the identified frames; and means for selecting the identified frames by detecting that the camera is moving towards and with the subject based on the size of the subject within each of a plurality of the identified frames.

According to still another aspect of the present disclosure, there is provided a system for selecting frames of a video sequence, the system comprising:

a memory for storing data and a computer program;

a processor coupled to the memory for executing computer program, the program comprising instructions for:

capturing image data for a plurality of consecutive frames of the video sequence using a camera;

identifying frames from the plurality of consecutive frames where the camera is moving using the captured image data, wherein each of the identified frames comprises a subject;

determining a size of the subject captured in each of the identified frames; and selecting the identified frames by detecting that the camera is moving towards and with the subject based on the size of the subject within each of a plurality of the identified frames.

According to still another aspect of the present disclosure, there is provided a non-transitory computer readable storage medium having a program for selecting frames of a video sequence, the program comprising:

code for capturing image data for a plurality of consecutive frames of the video sequence using a camera;

code for identifying frames from the plurality of consecutive frames where the camera is moving using the captured image data, wherein each of the identified frames comprises a subject;

code for determining a size of the subject captured in each of the identified frames; and code for selecting the identified frames by detecting that the camera is moving towards and with the subject based on the size of the subject within each of a plurality of the identified frames.

Other aspects are also disclosed.

BRIEF DESCRIPTION OF THE DRAWINGS

One or more embodiments of the invention will now be described with reference to the following drawings, in which:

FIG. 9A is a diagram showing a low resolution representation of a video frame;

FIG. 9B is a diagram showing a low resolution representation of another video frame;

FIG. 9C is a diagram showing a low resolution representation of another video frame;

DETAILED DESCRIPTION INCLUDING BEST MODE

Figure 1A:
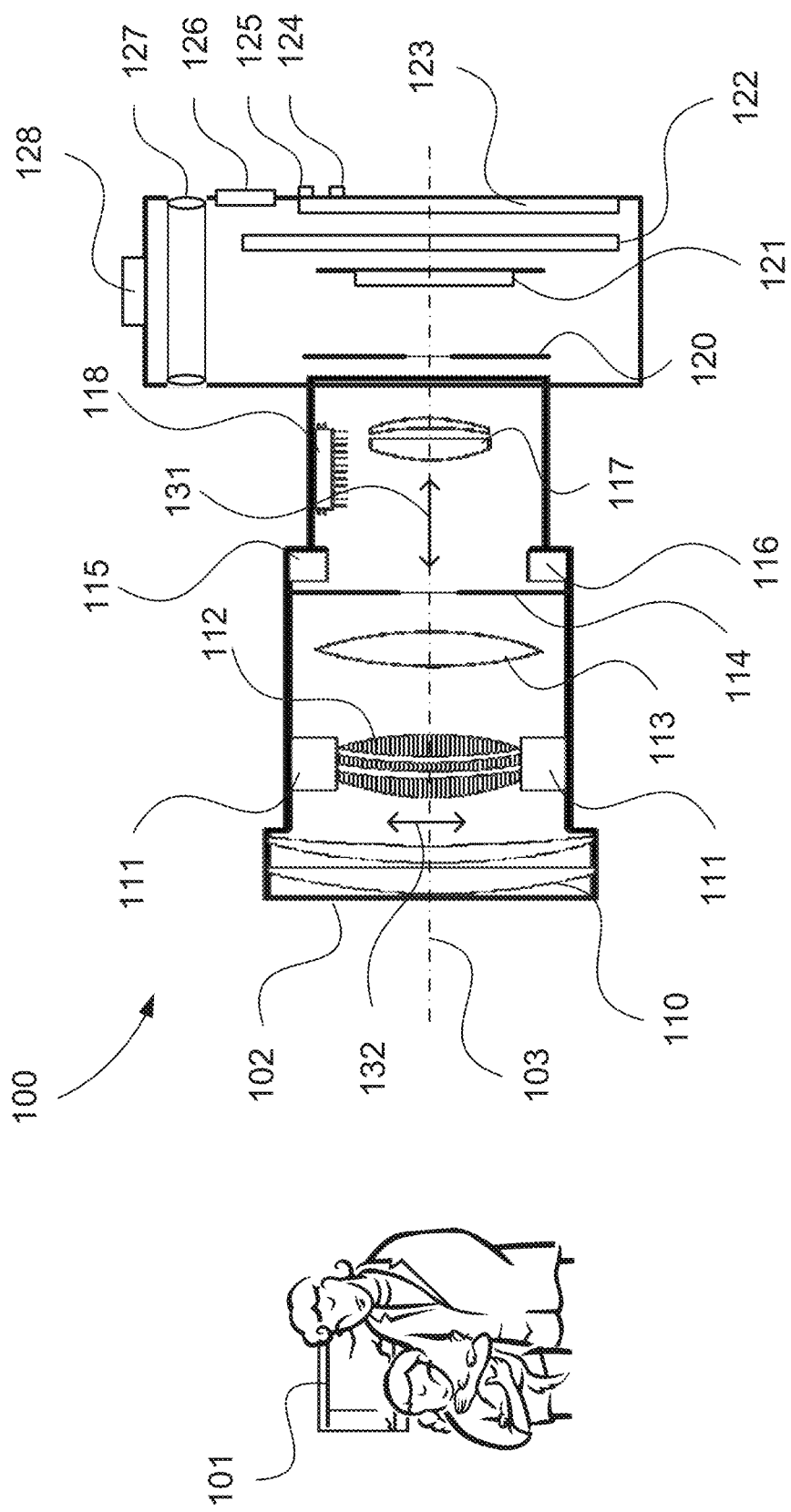
FIG. 1A is a diagram of an image capture system capable of shooting both still images and video sequences.

Where reference is made in any one or more of the accompanying drawings to steps and/or features, which have the same reference numerals, those steps and/or features have for the purposes of this description the same function (s) or operation(s), unless the contrary intention appears.

FIG. 1A is a cross-section diagram of an example image capture system 100, upon which methods to be described can be practiced. In the general case, the image capture system 100 may be a digital still camera or a digital video camera (also referred to as a camcorder). Nevertheless, the methods to be described may also be performed on higher-level devices such as desktop computers, server computers, and other such devices with significantly larger processing resources.

The image capture system 100 will be referred to below as the "camera system 100", the "camera 100" or the "video capture device 100". The terms "image" and "frame" are also used interchangeably in the following description.

As seen in FIG. 1A, the camera system 100 comprises an optical system 102 which receives light from a scene 101 and forms an image on a sensor 121. The sensor 121 comprises a 2D array of pixel sensors which measure the intensity of the image formed on it by the optical system as a function of position. The operation of the camera 100, including user interaction and all aspect of reading, processing and storing image data from the sensor 121 is coordinated by a main controller 122 which comprises a special purpose computer system. The system 100 is considered in detail below. The user is able to communicate with the controller 122 via a set of buttons including a shutter release button 128, used to initiate focus and capture of image data, and other general and special purpose buttons 124, 125, 126 which may provide direct control over specific camera functions such as flash operation or support interaction with a graphical user interface presented on a display device 123. The display device 123 may also have a touch screen capability to further facilitate user interaction. Using the buttons and controls it is possible to control or modify the behaviour of the camera 100. Typically it is possible to control capture settings such as the priority of shutter speed or aperture size when achieving a required exposure level, or the area used for light metering, use of flash, ISO speed, options for automatic focusing and many other photographic control functions. Further, it is possible to control processing options such as the colour balance or compression quality. The display 123 is typically also used to review the captured image or video data. It is common for a still image camera to use the display 123 to provide a live preview of the scene, thereby providing an alternative to an optical viewfinder 127 for composing prior to still image capture and during video capture.

The optical system 102 comprises an arrangement of lens groups 110, 112, 113 and 117 which can be moved relative to each other along a line 131 parallel to an optical axis 103 under control of a lens controller 118 to achieve a range of magnification levels and focus distances for the image formed at the sensor 121. The lens controller 118 may also control a mechanism 111 to vary the position, on any line 132 in the plane perpendicular to the optical axis 103, of a corrective lens group 112, in response to input from one or more motion sensors 115, 116 or the controller 122 so as to shift the position of the image formed by the optical system 102 on the sensor 121. Typically, the corrective optical element 112 is used to effect an optical image stabilisation by correcting the image position on the sensor 121 for small movements of the camera 100 such as those caused by hand-shake. The optical system 102 may further comprise an adjustable aperture 114 and a shutter mechanism 120 for restricting the passage of light through the optical system 102. Although both the aperture and shutter are typically implemented as mechanical devices they may also be constructed using materials, such as liquid crystal, whose optical properties can be modified under the control of an electrical control signal. Such electro-optical devices have the advantage of allowing both shape and the opacity of the aperture to be varied continuously under control of the controller 122.

Figure 1B:
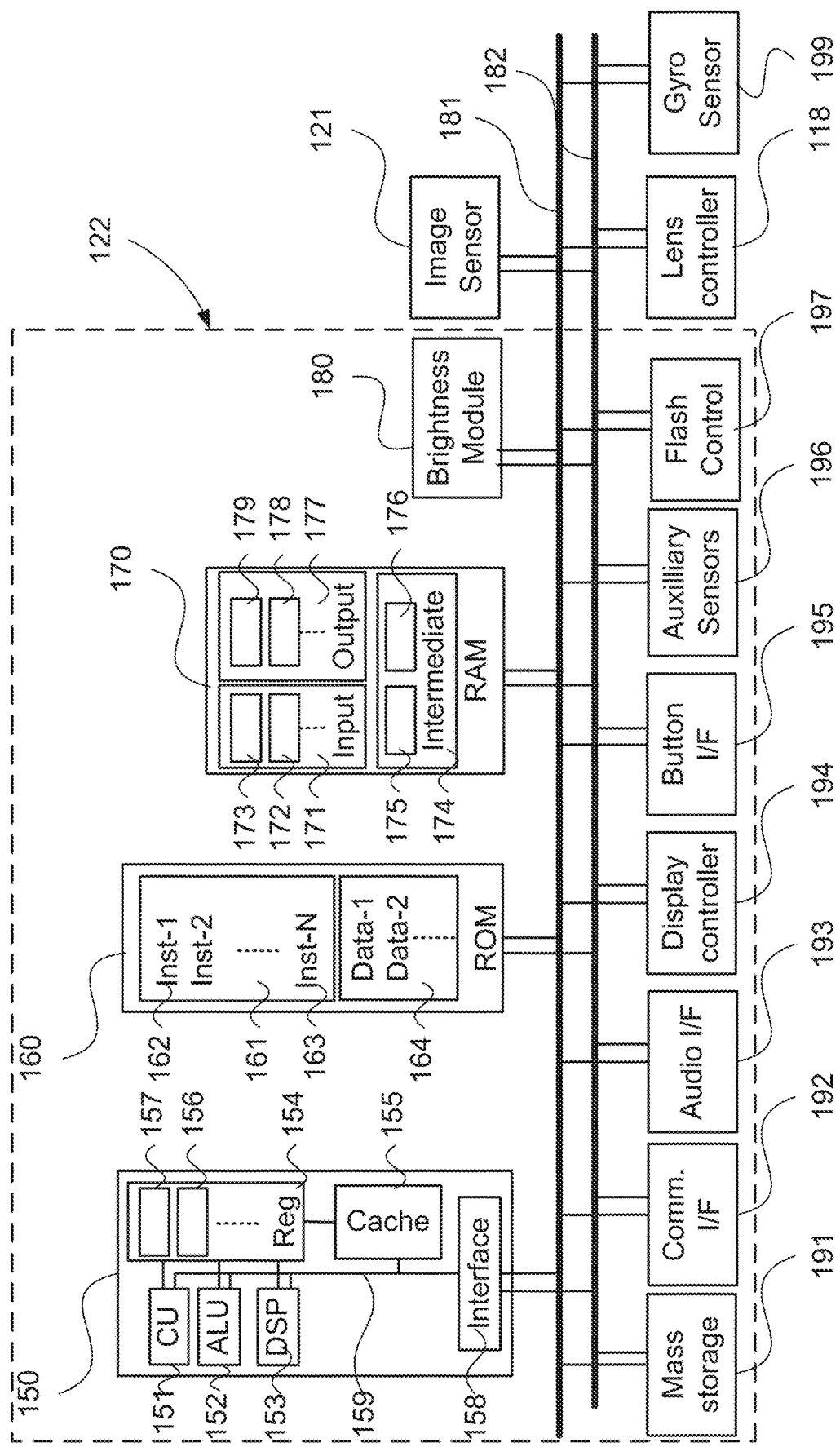
FIG. 1B is a schematic block diagram of a controller of the image capture system of FIG. 1A.

FIG. 1B is a schematic block diagram of the controller 122 of FIG. 1B, in which other components of the camera system 100 which communicate with the controller 122 are depicted as functional blocks. In particular, the image sensor 121, lens controller 118 and gyro sensor 199 are depicted without reference to their physical organisation or the image forming process and are treated only as devices which perform specific pre-defined tasks and to which data and control signals can be passed.

FIG. 1B also depicts a flash controller 197 which is responsible for operation of a strobe light that can be used during image capture in low light. Auxiliary sensors 196 may include orientation sensors that detect if the camera 100 is in a landscape of portrait orientation during image capture; other sensors that detect the colour of the ambient illumination or assist with autofocus and so on. Although the auxiliary sensors 196 are depicted as part of the controller 122, the auxiliary sensors 196 may in some implementations be implemented as separate components within the camera system 100. The gyro sensor 199 detects angular motion of the camera 100. The gyro sensor 199 may report angular motion in pitch and yaw. The gyro sensor 199 may form part of sensors 115 and/or 116 as shown on FIG. 1A, or the gyro sensor 199 may be a separate sensor. An orientation sensor (not shown) may be used to detect the angular position of the camera 100 in the roll axis. Orientation sensor information may be derived from the gyro sensor 199, or the orientation sensor may be a separate sensor. The orientation sensor may report the camera orientation in ninety (90) degree increments.

The controller 122 comprises a processing unit (or processor) 150 for executing program code, Read Only Memory (ROM) 160 and Random Access Memory (RAM) 170 as well as non-volatile mass data storage 191. The controller 122 may also comprise a dedicated brightness module 180. In addition, at least one communications interface (I/F) 192 is provided for communication with other electronic devices such as printers, displays and general purpose computers. Examples of communication interfaces include USB, IEEE1394, HDMI and Ethernet. An audio interface 193 comprises one or more microphones and speakers for capture and playback of digital audio data. A display controller 194 and button interface 195 are also provided to interface the controller 122 to the display 123 and controls present on a body of the camera 100. The components of the camera 122 are interconnected by a data bus 181 and control bus 182.

In a capture mode, the controller 122 operates to read data from the image sensor 121 and audio interface 193 and manipulate that data to form a digital representation of the scene that can be stored to a non-volatile mass data storage 191. In the case of a still image camera, image data may be stored using a standard image file format such as JPEG or TIFF, or the image data may be encoded using a proprietary raw data format that is designed for use with a complimentary software product that would provide conversion of the raw format data into a standard image file format. Such software would typically be run on a general purpose computer. For a video camera, the sequences of images that comprise the captured video are stored using a standard format such DV, MPEG, H.264. Some of these standard formats are organised into files such as AVI or Quicktime referred to as container files, while other formats such as DV, which are commonly used with tape storage, are written as a data stream. The non-volatile mass data storage 191 is used to store the image or video data captured by the camera system 100 and has a large number of realisations including but not limited to removable flash memory such as a compact flash (CF) or secure digital (SD) card, memory stick, multimedia card, miniSD or microSD card; optical storage media such as writable CD, DVD or Blu-ray disk; or magnetic media such as magnetic tape or hard disk drive (HDD) including very small form-factor HDDs such as microdrives. The choice of mass storage depends on the capacity, speed, usability, power and physical size requirements of the particular camera system 100.

Scene brightness information is provided by the brightness module 180. The brightness module 180 may take information from the image sensor 121 or the brightness module 180 may be a separate sensor. The brightness module 180 is configured to determine the correct exposure when capturing video sequences or still images. The brightness module 180 typically records a single brightness value which represents the scene brightness, often determined as defined by the photography industry standard APEX system. The brightness value may be stored as metadata alongside the captured still image or video sequence. Camera motion information from the gyro sensor 199 and orientation information from the orientation sensor, if the gyro sensor 199 and orientation sensor are used in the camera system 100, may also be stored alongside the still image or video sequence as metadata. When a video sequence is being captured, the metadata is associated with frames in the video sequence. Thus, for each frame in the video sequence there will be scene brightness information and camera motion information stored in the metadata which is particular to that frame.

In a playback or preview mode, the controller 122 operates to read data from the mass storage 191 and present that data using the display 194 and audio interface 193.

The processor 150 is able to execute programs stored in one or both of the connected memories 160 and 170. When the camera system 100 is initially powered up, system program code 161, resident in ROM memory 160, is executed. The system program permanently stored in the ROM 160 is sometimes referred to as firmware. Execution of the firmware by the processor 150 fulfils various high level functions, including processor management, memory management, device management, storage management and user interface.

The system program code 161 may be stored in a computer readable medium, including the storage devices described below, for example. The system program code 161 is loaded into the system 100 from the computer readable medium, and then executed by the system 100. A computer readable medium having such software or computer program recorded on the computer readable medium is a computer program product.

In some instances, the system program code 161 may be supplied to the user encoded on one or more CD-ROMs and read via a corresponding drive, or alternatively may be read by the user from a network. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the system 100. Examples of transitory or non-tangible computer readable transmission media that may also participate in the provision of software, application programs, instructions and/or data to the system 100 include radio or infra-red transmission channels as well as a network connection to another computer or networked device, and the Internet or Intranets including e-mail transmissions and information recorded on Websites and the like. The processor 150 includes a number of functional modules including a control unit (CU) 151, an arithmetic logic unit (ALU) 152, a digital signal processing engine (DSP) 153 and a local or internal memory comprising a set of registers 154 which typically contain atomic data elements 156, 157, along with internal buffer or cache memory 155. One or more internal buses 159 interconnect these functional modules. The processor 150 typically also has one or more interfaces 158 for communicating with external devices via the system data 181 and control 182 buses.

The system program 161 includes a sequence of instructions 162 through 163 that may include conditional branch and loop instructions. The program 161 may also include data which is used in execution of the program 161. The data used in execution of the program 161 may be stored as part of the instruction or in a separate location 164 within the ROM 160 or RAM 170.

In general, the processor 150 is given a set of instructions which are executed therein. The set of instructions given to the processor 150 may be organised into blocks which perform specific tasks or handle specific events that occur in the camera system 100. Typically the system program 161 will wait for events and subsequently execute the block of code associated with that event. The execution of a block of code associated with an event may involve setting into operation separate threads of execution running on independent processors in the camera system 100, such as the lens controller 118 that will subsequently execute in parallel with the program running on the processor 150. Events may be triggered in response to input from a user as detected by the button interface 195. Events may also be triggered in response to other sensors and interfaces in the camera system 100.

The execution of a set of the instructions may require numeric variables to be read and modified. Such numeric variables are stored in RAM 170. Methods disclosed below may use input variables 171 that are stored in known locations 172, 173 in the memory 170. The input variables are processed to produce output variables 177, that are stored in known locations 178, 179 in the memory 170. Intermediate variables 174 may be stored in additional memory locations in locations 175, 176 of the memory 170. Alternatively, some intermediate variables may only exist in the registers 154 of the processor 150.

The execution of a sequence of instructions is achieved in the processor 150 by repeated application of a fetch-execute cycle. The control unit 151 of the processor 150 maintains a register called the program counter which contains the address in memory 160 of the next instruction to be executed. At the start of the fetch execute cycle, the contents of the memory address indexed by the program counter is loaded into the control unit 151. The instruction thus loaded controls the subsequent operation of the processor 150, causing for example, data to be loaded from memory 170 into processor registers, the contents of a register to be arithmetically combined with the contents of another register, the contents of a register to be written to the location stored in another register and so on. At the end of the fetch execute cycle the program counter is updated to point to the next instruction in the program 161. Depending on the instruction just executed updating the program counter may involve incrementing the address contained in the program counter or loading the program counter with a new address in order to achieve a branch operation.

Each step or sub-process in the processes of flow charts are associated with one or more segments of the program 161, and is performed by repeated execution of a fetch-execute cycle in the processor 150 or similar programmatic operation of other independent processor blocks in the camera system 100.

It would be desirable to select highlights on the camera 100 itself for several reasons. One reason is to simplify the video production process, in order to make it more likely camera operators would use the feature. Furthermore, if the camera 100 is network connected the camera 100 would also allow the selected highlights to be directly uploaded from the camera 100 to Internet video sharing services. Still further, additional metadata about the video sequence is easily accessible from software executing on the camera 100 itself.

One problem with selecting video highlights automatically on the camera 100, is that available processing power is typically limited. Available general purpose processing power and memory capacity are usually limited on a camera such as the camera 100, and the requirement to maximise battery life further limits the amount of processing that can be done on the camera 100. These limitations largely rule out using video frame image processing techniques for highlight selection on cameras.

Highlight selection may be performed using only the video metadata, which typically contains much less information than the video frame data, so processing can be performed more quickly and cheaply.

Parents of young children often capture video sequences where the camera operator is following a child (or group of children) as the child is running or walking. The captured video sequences appear to capture the world through the eyes of a child. The video sequences represent what the child is seeing and the captured video sequence is directed not by the operator of the camera but by the child who ultimately determines where the camera goes and the part of a scene that is captured.

Figure 2:
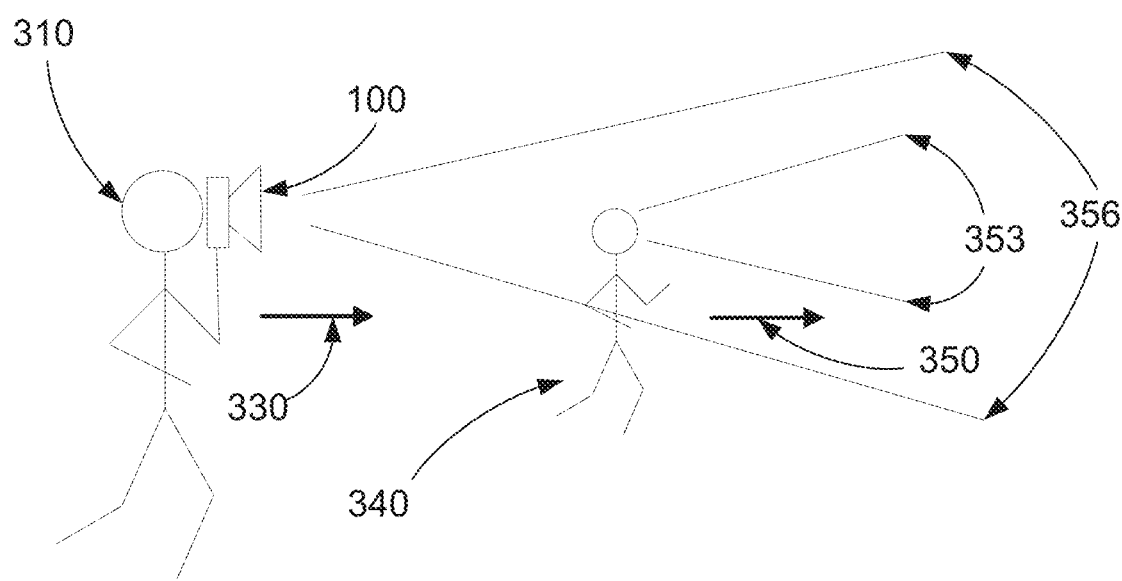
FIG. 2 is a diagram showing a camera operator following a subject.

For example, FIG. 2 shows a walking camera operator 310 using the camera 100 to capture a video sequence of a walking or running subject 340. The subject 340 may be referred to as a "followed subject". A direction 330 of the camera operator 310 is dictated by and is the same as a direction 350 of the subject 340. A scene 356 that is captured using the camera 100 is substantially similar to a view 353 of the subject 340.

Figure 3:
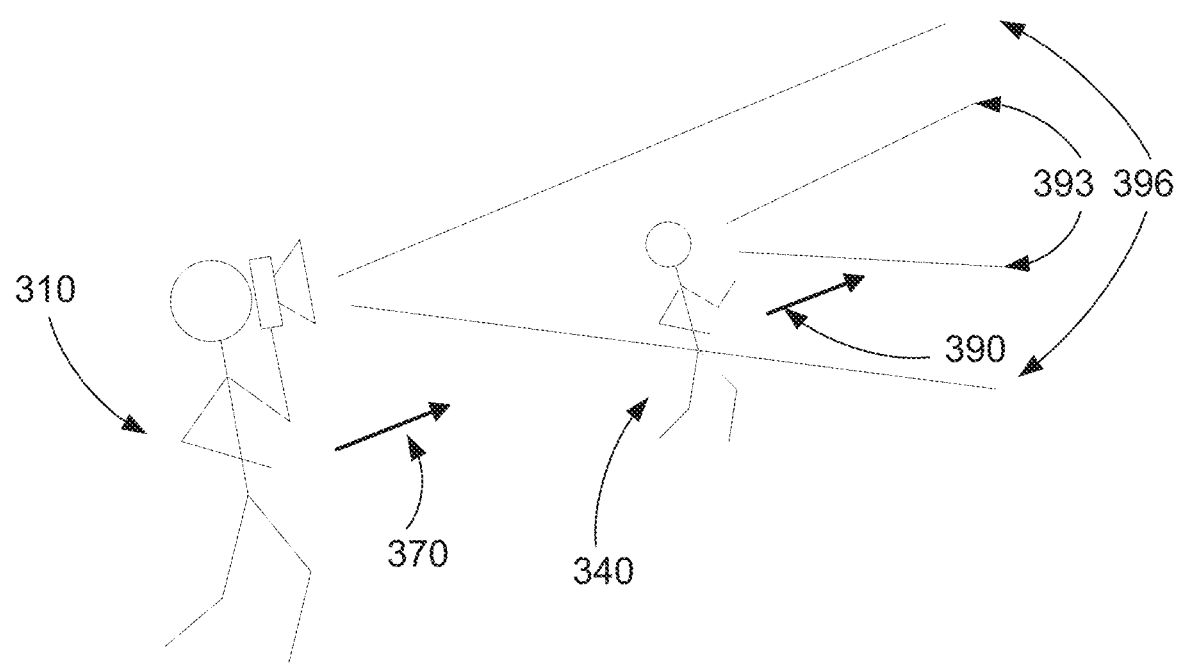
FIG. 3 is a diagram showing the camera operator following the subject of FIG. 2 changing direction.

As seen in FIG. 3, at a later time within the video sequence the same subject 340 has a changed direction 390 which has resulted in the camera operator 310 having a new direction 370. The view 393 of the subject 340 is substantially similar to the scene 396 captured by the camera 100. As such, when the camera operator follows the subject in such manner (i.e. the view 393 of the subject 340 remains substantially similar to the scene 396), it may be considered that movements of the camera operator and the subject are substantially synchronised.

Although the case most often used as an example in this description is of a parent camera operator walking to capture their child walking or running, other cases of a walking camera operator capturing a subject walking are also common and also desirable as highlights from a video sequence. In fact, it is a common cinematic effect to have a camera following a moving subject.

Disclosed below are arrangements directed towards providing a method of selecting video highlights from a captured video sequence based on detection of a camera operator following a subject in video frames of the sequences. Each video highlight comprises a series of sequential video frames of a video sequence. The video frames may be extracted from a video sequence in a video decoding process. The extracted frames may be treated the same as images obtained through digital still photography.

In addition to video frames that are captured using the camera 100, video metadata may be captured and recorded along with the video frames. The video metadata may include data from accelerometer sensors, gyro sensors, exposure sensors, luminance sensors. The video metadata may also include Global Position System (GPS) data and face detection data. Some of the metadata may be stored with each frame while some such as GPS or luminance data may be updated less frequently.

Figure 4:
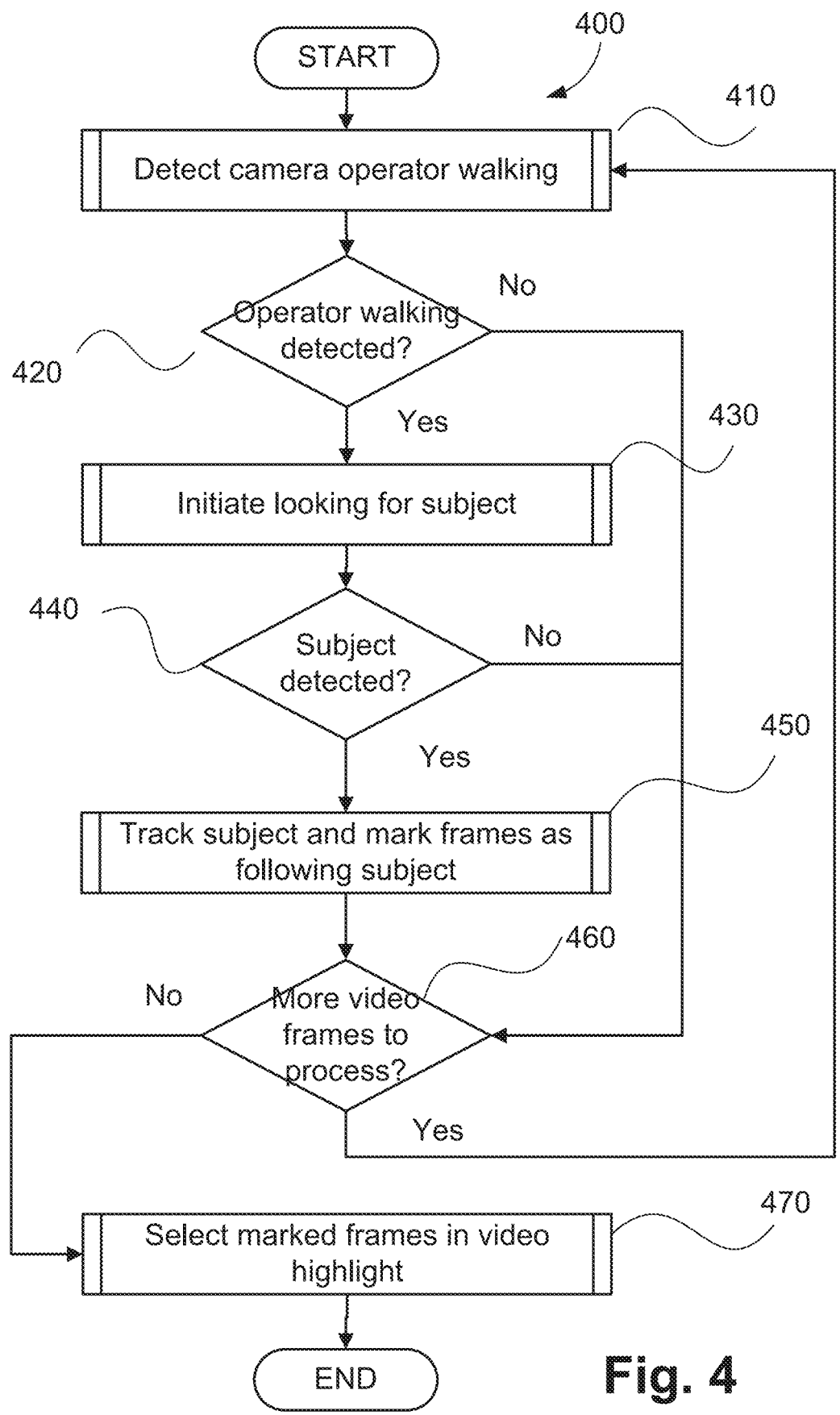
FIG. 4 is a schematic flow diagram showing a method of selecting at least one sequence of video frames of an input video sequence as a video highlight.

FIG. 4 is a flow diagram showing a method 400 of selecting at least one sequence of video frames of an input video sequence as a video highlight. The method 400 determines desirable frames from the input video sequence based on detection of engagement between a camera operator and moving subjects. The method 400 may be used to detect a subject in frames of the input video sequence where a face the subject is unidentifiable in the frames.

The method 400 may be implemented as one or more software code modules of the system program 161 resident in the ROM 160 of the camera 100 and being controlled in its execution by the processor 150 of the camera 100. Alternatively, the method 400 may be implemented on a desktop computer or the like after the input video sequence has been downloaded to the desktop computer.

Detecting the video highlights on the camera 100 itself has several advantages. For example, detecting the video highlights on the camera 100 simplifies the video production process, in order to make it more likely that camera operators use the feature. Furthermore, as described above, if the camera 100 is network connected, the camera 100 would also allow the selected highlights to be directly uploaded from the camera 100 to Internet video sharing services. Video highlights are shorter than an original video, so the video highlights will upload faster and consume less network bandwidth. Also additional metadata about the video sequence is easily accessible from software running on the camera 100 itself.

As also described above, one problem with selecting video highlights automatically on the camera 100, is that available processing power is typically severely limited. The method 400 addresses the camera limitations allowing the method 400 to execute on both the camera 100 and a more powerful and adaptable computer environment.

The method 400 shows the overall processing of video sequences with the selected highlights as the output. Input to the method 400 is the image data for the frames of the video sequence captured using the camera 100. Alternatively, input to the method 400 may be metadata associated with the frames of the captured video sequence. The metadata associated with the frames of the captured video sequence may comprise gyro or GPS data for determining if the camera 100 is moving and luminance data for determining a size and position of a subject in a frame of the captured video sequence. The frames captured using the camera 100 may be a plurality of consecutive frames. However, the method 400 may be used for processing frames which are not consecutive. As described in detail below, steps 410, 430 and 450 of the method 400 are used for identifying frames from the frames of the captured video sequence where the camera 100 is moving.

The method 400 begins at detecting step 410, to detect, under execution of the processor 150, whether an operator of the camera 100 is walking. A method of 500 of detecting if the camera operator is walking, as executed at step 410, will be described in detail below with reference to FIG. 5A. Another method 500 of detecting if the camera operator is walking, as executed at step 410, will also be described in detail below with reference to FIG. 5B.

Then at decision step 420, if camera operator walking has been detected then the method 400 will pass to the step 430. If no camera operator walking is detected then the method 400 passes to decision step 460 and processing of subsequent frames of the input video sequence.

At initiating step 430, detection of a followed subject is initiated under execution of the processor 150. A method 600 of detecting a followed subject, as executed at step 430, will be described below with reference to FIG. 6.

If a followed subject is detected, then at decision step 440 the method 400 proceeds to step 450. Otherwise, if no followed subject is detected then the method 400 proceeds to step 460.

At tracking step 450, a span of frames for which the subject is followed is determined under execution of the processor 150. The span of frames determined at step 450 is identified as frames where the camera 100 is moving. Also at step 450, the frames which have been identified as being captured while the camera operator is walking and which include a followed subject are marked so that the marked frames can be used for selecting video highlights. Each of the marked frames comprises the followed subject.

Figure 7:
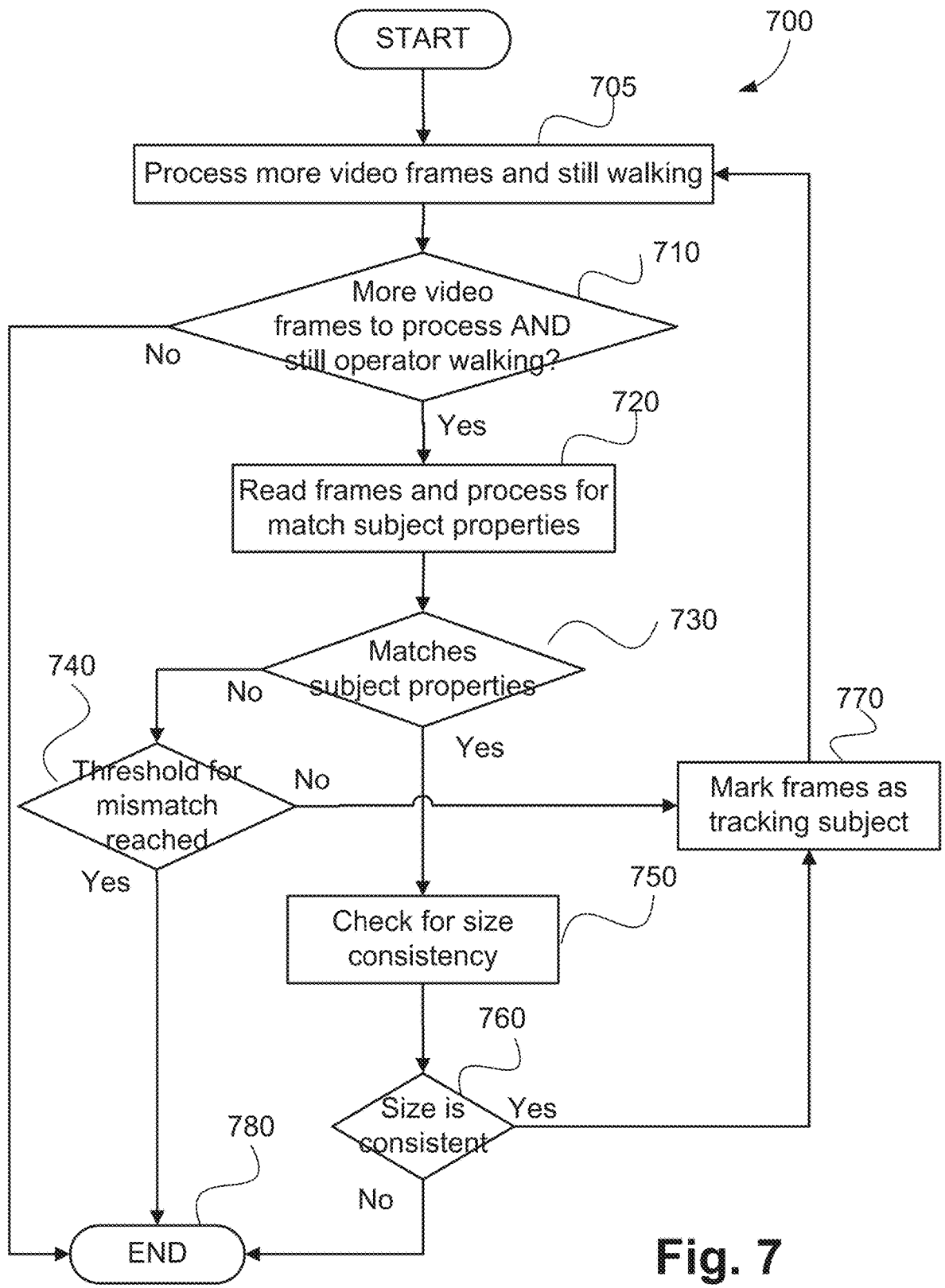
FIG. 7 is a schematic flow diagram showing a method of detecting video frames corresponding to the camera operator following a subject.

A method 700 of detecting video frames corresponding to the camera operator following a subject, as executed at step 450, is described in more detail below with reference to FIG. 7. Step 450 will complete when either the followed subject is no longer detected or the input video sequence has been completely processed. At decision step 460, if there are further frames of the input video sequence to be processed, then the method 400 returns to step 410. Otherwise, if there are no more frames of the input video sequence to be processed then the followed subject has completed and the method 400 proceeds to selecting step 470.

Figure 8:
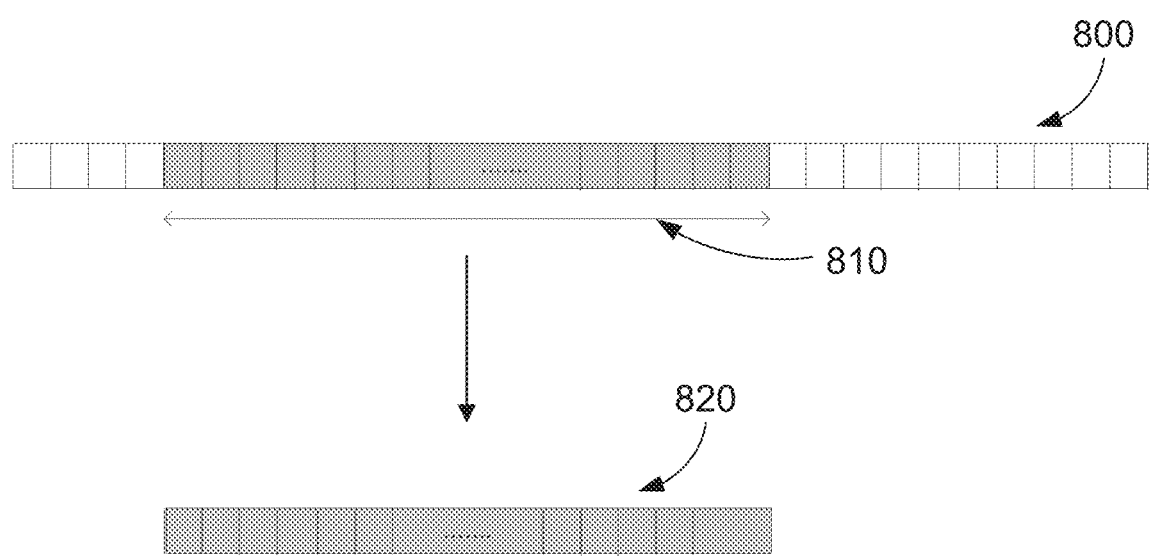
FIG. 8 is a diagram showing video frames marked as having the camera operator following a subject.

At selecting step 470, the frames that have been marked at step 450 as having a followed subject are processed for the purpose of selecting what sequences of frames are used for video highlights. In FIG. 8, a video 800 as processed by the method 400 is shown. The frames 810 coloured grey are a sequence which has been marked as having a followed subject. The frames 810 are a candidate for selection as a video highlight 820. Additionally, at step 470. the quality of the frames of the video highlight 820 are considered. For example, the frames 810 may be checked for blur and correct exposure. If a frame 810 does not have sufficient quality then the frame will not be selected as a video highlight.

Also, at step 470, the frames marked at step 450 may be processed to arbitrate between features other than "followed subject" when selecting frames for the highlight 820. For example, frames marked with large faces are considered desirable and a sequence of frames with large faces may also form candidate frames for a video highlight. One or more of the frames showing large faces, for example, may be included in the highlight 820.

The method 400 is based on sequential processing of frames. Alternative methods are possible. For example, all frames of the input video sequence may be processed to determine the frames in which the camera operator is walking and only then in a second step, the frames with detected camera operator walking would be further processed to determine whether there is a followed subject.

Other features may be used in addition to the "followed subject" determination to select a video highlight. For example, to select a video highlight, further features, such as a number of faces in a captures frame, size and position of faces, frame position within the captured video sequence may be considered. Statistically a subject of interest typically appears in the last third of the captured video sequence. Additionally, change of video camera configuration, such as pan/zoom, may be used to guide selection of a subject of interest. For example, frames of the captured video sequence immediately after a zoom or pan typically contain a subject of interest.

Figure 5A:
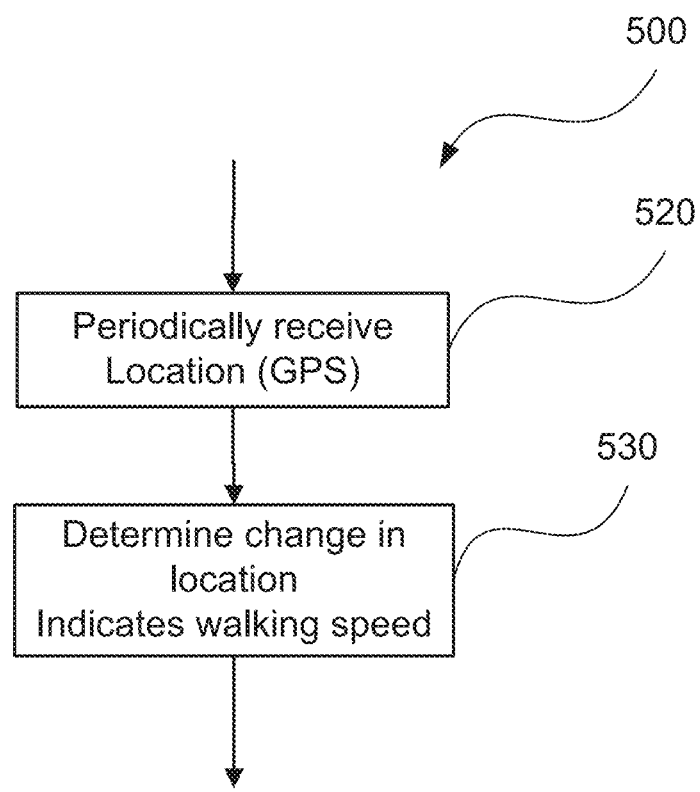
FIG. 5A is a schematic flow diagram showing a method of detecting if a camera operator is walking.

The method 500 of detecting if the operator of the camera 100 is walking, as executed at step 410, will be described by way of example with reference to FIG. 5A. Various methods for detecting whether the camera operator is walking may be used at step 410.

The method 500 may be implemented as one or more software code modules of the system program 161 resident in the ROM 160 of the camera 100 and being controlled in its execution by the processor 150 of the camera 100.

At receiving step 520, the camera 100 periodically determines a position of the camera 100 using data received from a Global Positioning System (GPS). GPS data received by the camera 100 at step 520 may be stored in the RAM 170.

Changes to the GPS position over time are then used at determining step 530 to determine whether the changes to the GPS position match walking speeds and patterns. If there is a match then walking is assumed. Many video capturing devices have GPS capability making the method 500 possible. GPS co-ordinates can be placed in video metadata associated with the frames of the input video sequence.

Figure 5B:
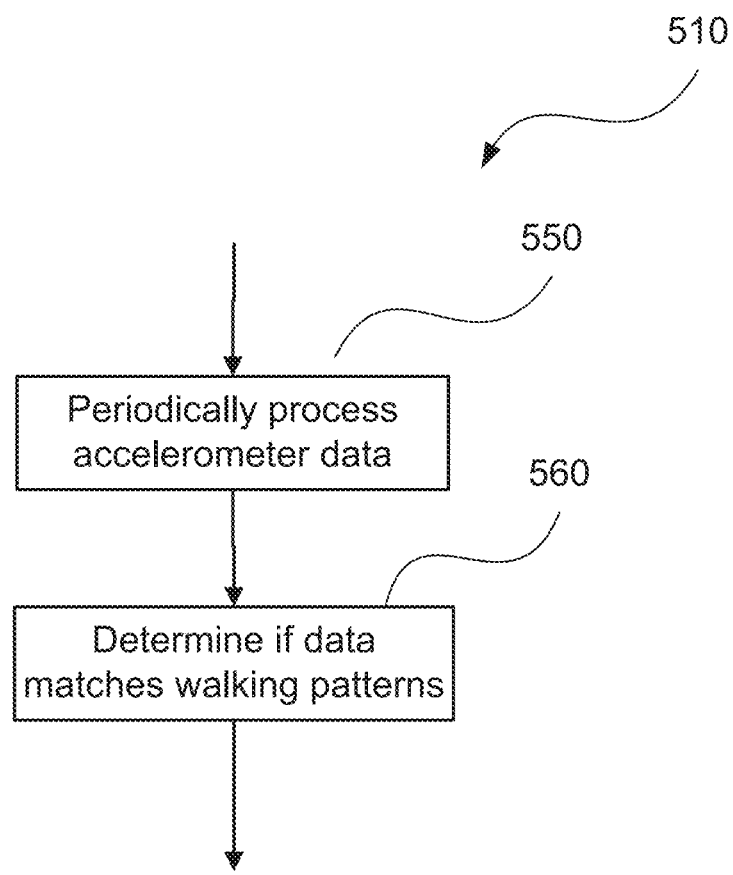
FIG. 5B is a schematic flow diagram showing another method of detecting if a camera operator is walking.

The method 510 of detecting if the operator of the camera 100 is walking, as may be alternatively executed at step 410, will be described by way of example with reference to FIG. 5B. The method 510 makes use of accelerometer data from accelerometer sensors associated with the camera 100.

The method 510 may be implemented as one or more software code modules of the system program 161 resident in the ROM 160 of the camera 100 and being controlled in its execution by the processor 150 of the camera 100.

The method 510 begins at receiving step 550, where accelerometer data is periodically received by the camera 100 and processed. The accelerometer data received at step 550 may be stored in the RAM 170.

Then at determining step 560, it is determined, under execution of the processor 150, whether the received accelerometer data matches a walking pattern. In particular, the vertical acceleration period and changes are consistent with walking steps. The accelerometer data can be placed in video metadata associated with the frames of the input video sequence.

The methods which may be used at 410 for detecting whether the camera operator is walking are not restricted to those described with reference to 500 and 510. The GPS and accelerometer data is available on the camera 100 and so the methods 500 and 510 may be implemented on the camera 100. Additionally, the GPS and accelerometer data may be placed in the video metadata so the GPS and accelerometer data can be processed at any time that the frames of the input video sequence are processed. The GPS and accelerometer data may be processed on the camera 100 subsequent to the input video sequence being captured. The GPS and accelerometer data may also be processed on any device such as a computer that has downloaded the input video sequence which may include the video metadata.

Figure 6:
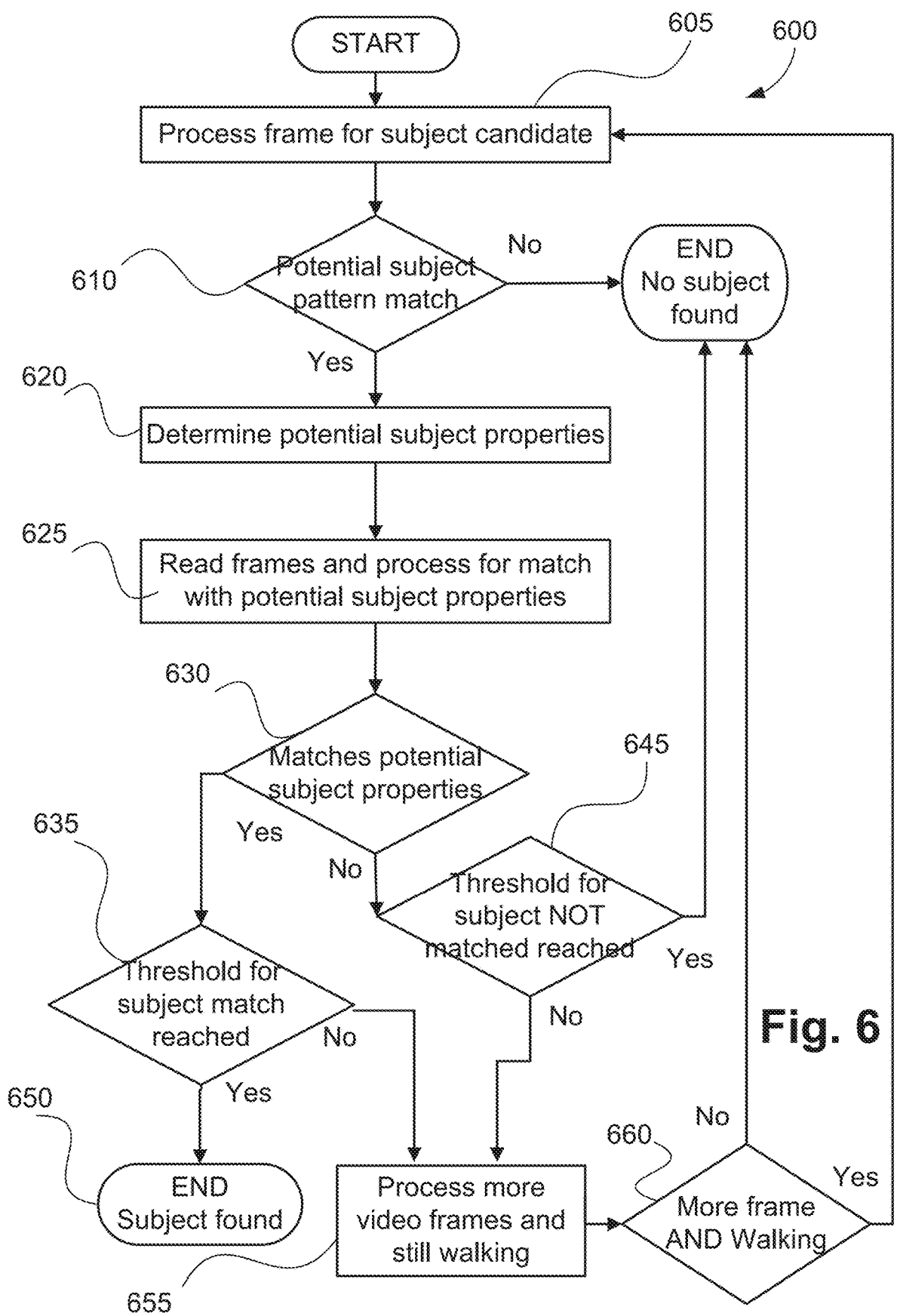
FIG. 6 is a schematic flow diagram showing a method of detecting video frames representing a camera operator following a subject.

The methods 600 and 700 will be described below with reference to FIGS. 6 and 7. In one arrangement, the methods 600 and 700 require a minimal processing environment and are suitable for implementation on a device such as the camera 100. The methods 600 and 700 will be described by way of example with reference to FIGS. 9A, 9B and 9C.

In one arrangement, the method 600 does not require processing of pixel data of the frames of the input video sequence. Rather than processing the pixel data of the frames, the method 600 may make determinations based on a very low resolution luminance matrix representing regions of the frames of the input video sequence. The method 600 also does not require that the luminance information be provided for each frame of the input video sequence. In one arrangement, the luminance information is processed every half (½) second. The luminance information can be thought of representing a half (½) second of consecutive frames.

The luminance information is suitable for storage in metadata as luminance data has a small size and is only required for a small portion of the frames of the input video sequence. The method 600 may be configured to use only the video metadata as input and does not require decoding the input video sequence into the frames of the video sequence. FIGS. 9A, 9B and 9C show example low resolution luminance data matrices 955, 965 and 975, respectively. The luminance data matrices 955, 965 and 975 use 24×20 luminance values to represent brightness of corresponding areas in original frames 905, 915, and 925, respectively.

Using low resolution data is more prone to false positive and false negative detections. However, the method 400 may be configured to only process frames of the input video sequence for a followed subject when it has been detected that the operator of the camera 100 is walking. Processing frames of the input video sequence for a followed subject when it has been detected that the operator of the camera 100 is walking, increases reliability of the method 400. The increase in reliability results since signals for subject detection do not need to be as strong. Further details of how a luminance matrix may be used are provided with the description of method 600 of FIG. 6, and method 700 of FIG. 7.

In another arrangement, the method 600 may use body detection to detect a followed subject. Body detection requires processing pixels of the frames of the input video sequence. Body detection methods typically require processing full or slightly reduced images. Any suitable human body detection algorithm, such as algorithms using articulated shape models or skeletal models, may be used to detect a followed subject.

The method 600 may be implemented as one or more software code modules of the system program 161 resident in the ROM 160 of the camera 100 and being controlled in its execution by the processor 150 of the camera 100.

The method 600 is executed when it has been detected that the operator of the camera 100 is walking. The method "looks for" a subject in a first frame of the input video sequence and if a subject is detected, then the method 600 checks that the subject is present for some threshold number of frames before returning with a status "Subject found".

The method 600 begins at a first processing step 605, where a frame (e.g., frame 905) of the input video sequence is received and processed to detect any potential subject in the frame. In one arrangement, detection of a subject at step 605 may require a match of at least an upper torso of a person represented in the frame against some model. For example, an articulated shape or skeletal model may be matched to the upper torso.

As described above, in one arrangement, subject detection may be performed by processing low resolution luminance matrices. In the example of FIGS. 9A, 9B and 9C, the original video frames 905, 915, and 925 capture the back of a subject 910. The subject 910 is not of consistent size and position in the frames 905, 915 and 925 due to the subject 910 walking or running while the camera operator is walking to follow the subject 910 and using the camera 100 to capture the frames 905, 915 and 925. The frames 905, 915 and 925 need not be consecutive. In one arrangement, there is a half second separation between the frames (e.g., 905, 915 and 925) that have a luminance matrix that can be processed.

It is common for video sequences to have thirty (30) frames per second so in that case there will be a luminance matrix for every fifteen (15) video frames. In the example of FIGS. 9A, 9B and 9C, the luminance matrices 955, 965 and 975 contain 24×20 luminance values that correspond to the brightness of the different cells if a frame is divided into 24×20 cells. The luminance values are visualised in the matrices 955, 965 and 975. In FIGS. 9A, 9B and 9C, there is a correspondence between the blocks of connected low and high luminance blocks of the subject 910 shown in each of the matrices 955, 965 and 975 and the subject 910 shown in each of the frames 905, 910 and 925, respectively.

Figure 10A:
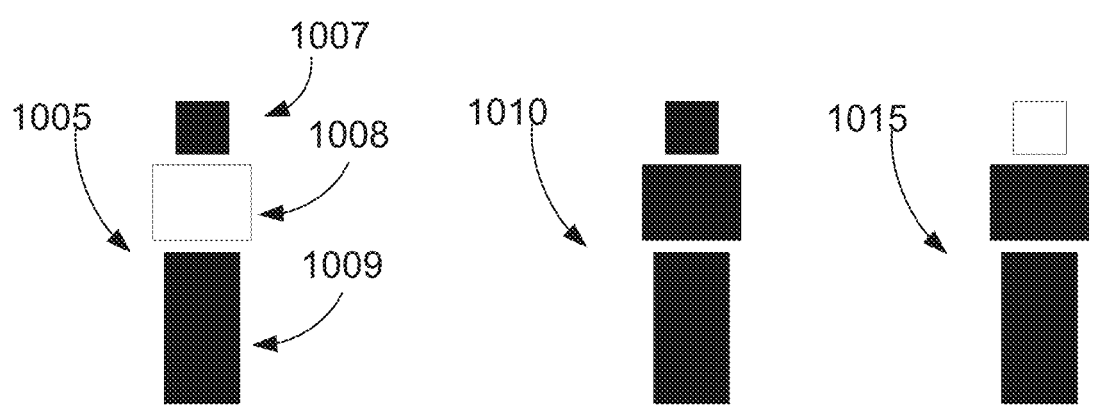
FIG. 10A shows three (3) example templates.
Figure 10B:
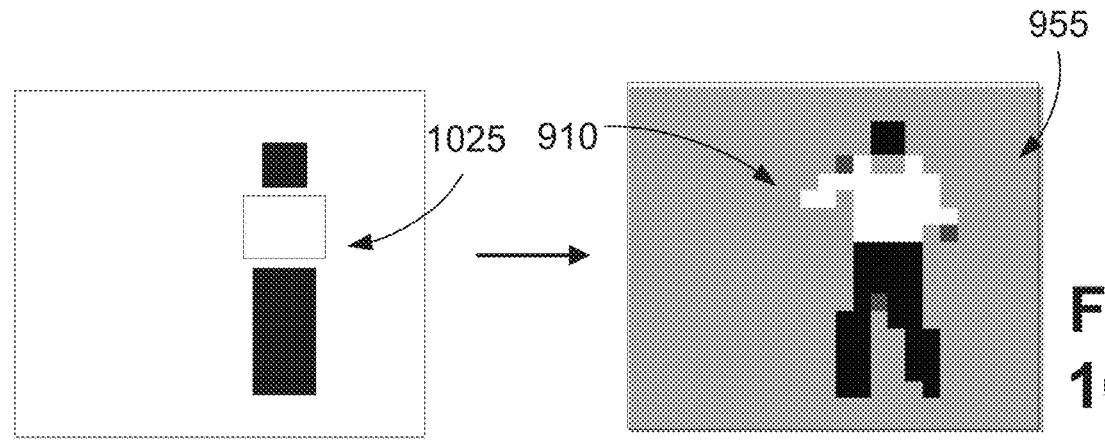
FIG. 10B shows a translated template and matrix.
Figure 10C:
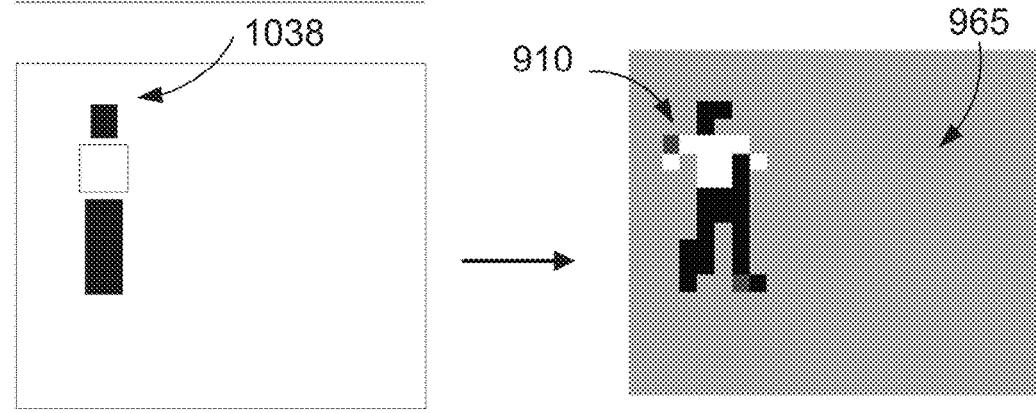
FIG. 10C shows another translated template and matrix.
Figure 10D:
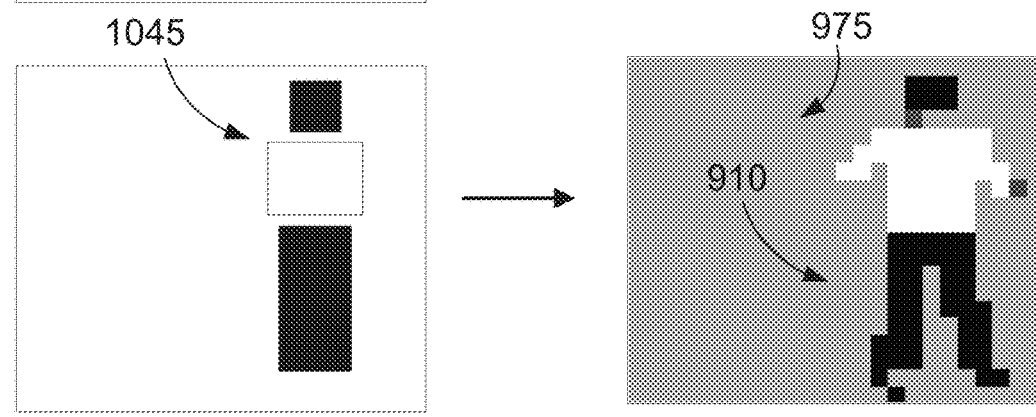
FIG. 10D shows another translated template and matrix.

In one arrangement, template matching may be used for subject detection. FIG. 10A shows three (3) example templates 1005, 1010, and 1015. Each of the templates 1005, 1010 and 1015 has three components corresponding to a head (e.g., 1007), torso (e.g., 1008) and lower limbs (e.g., 1009). The template 1007 is configured to match a dark back of head, a light back of shirt and dark pants or dress. The template may be extended from the three (3) example templates shown in FIG. 10A. Different template arrangements to the three components 1007, 1008 and 1009 of the example templates 1007, 1010 and 1015 may be defined. Further, the templates 1007 and 1010 and 1015 may be extended with more than just dark and low luminance ranges. For example, a medium luminance matching component may be included in a template.

A subject is detected when a template substantially matches a "region" in a luminance matrix. In the example of FIGS. 10A, 10B, 10C and 10D, the template 1007 matches the subject 910 as represented in the corresponding three (3) luminance matrices 955, 965, and 975.

The subject 910 can have different size and position within the original frames 905, 915 and 925 and so the match between the template 1007 and the subject 910 uses resized and translated templates 1025, 1038, and 1045 corresponding to the subject 910 represented in the matrices 955, 965 and 975 respectively. A minimum subject size may be set so that there is a corresponding minimum size to which a template can be resized.

One method of matching a template to a luminance matrix (e.g., 955) is to determine connected regions of cells with low luminance and connected regions of 'high luminance' in the luminance matrix then determine if the connected regions have a vertical alignment that matches the template. High luminance may be determined using a high pre-determined threshold (e.g. two hundred (200) for an 8-bit luminance value). Similarly, low luminance may be determined using a low pre-determined threshold (e.g. fifty (50) for an 8-bit luminance value). Cells with a luminance value below the low threshold would appear dark and cells above the high threshold would appear light.

In the example of FIGS. 9A to 9C, the top connected cells are dark, the centre connected cells are light and the bottom connected cells are dark. Further, the geometry of the connected regions in the luminance matrix need to "substantially" match the template components when the template has been resized and translated to overlay vertically aligned connected regions. A "substantial" match may be defined in accordance with Equation (1), as follows:

$$\#(\text{resized template component cells} \cap \text{connected cells}) / \#(\text{resized template component cells}) \geq \text{threshold } T1$$

AND $\#(\text{resized template component cells} \cup \text{connected cells}) / \#(\text{resized template component cells}) \leq \text{threshold } T2$ \hfill (1)

where the symbol "#" means "the number of", threshold "T1" may take a value of ½ and threshold "T2" may take a value of two (2). Different thresholds may be used and any suitable method may be used for determining a "substantial" match.

The resized and translated templates 1025, 1038, and 1045 may be processed using Equation (1) above until a match occurs.

Effectively a subject is detected as a number of dark/light regions in the luminance matrix each of which is formed by connecting adjacent dark/light cells. Equation (1) may be used as a measure of how closely the detected regions match a template. To determine a match, two conditions are tested: 1) the overlapping region is maximum (the component compared with the threshold T1) and the non-overlapping region is minimum (the component compared with threshold T2).

In one arrangement, some relaxation in the matching may be allowed after an initial match has been determined. A video frame may only capture the head and torso of the subject and so a match of only the top two components of the template may be treated as a match.

Further, an individual frame may have background items that match the luminance of part of the subject and a match may require a match of any two (2) of the three (3) template components. For example, the background of the image may be light and similar to the shirt colour of the subject 910, preventing a light connected region to be detected to match the middle light component 1008 of the template 1005.

Following step 605, the method 600 proceeds to decision step 610. At step 610, if no subject was detected in the frame (e.g., frame 905) at step 605, then the method 600 completes returning that no subject was detected. Otherwise, the method 600 proceeds to determining step 620 when a subject match was determined at step 605. The subject detected at step 605 is referred to as a "potential subject" because some filtering may be used to ensure that the detected subject is consistently detected in subsequent frames.

Then at determining step 620, properties that are required to determine that the subject that is followed is the same potential subject and does not change, are determined under execution of the processor 150. In one arrangement, the template that matches at step 605 is used as the potential subject property at step 620, since the method 600 will only look for a match to that template. In another arrangement, the colour of clothing and hair of the initial matching potential subject may be obtained from the pixel data of the frame received at step 605 and used as a signature of the potential subject that is to be matched in subsequent frames.

After the potential subject properties have been determined at step 620, the method 600 proceeds to receiving step 625. At step 625, subsequent frames of the input video sequence are received and processed to determine if there is a match between a subject in the frames and the subject properties determined at step 620. Step 625 is required as there needs to be a minimum period of detection of a consistent potential subject before the method 600 determines that there is a subject detected. Step 625 may be as short as one (1) second. In one arrangement, successive luminance matrices are processed at step 625 if there is a match to the potential subject properties determined at step 620. Successive luminance matrices are unlikely to correspond to successive frames. In another arrangement, successive frames are checked at step 625 for the presence of a subject matching the potential subject properties. The output of step 625 is used at decision step 630 to determine if there has been a detected match.

If a subject matching the potential subject properties is determined at step 630, then the method 600 proceeds to decision step 635. Otherwise, the method 600 proceeds to decision 645 if there is no match.

At decision step 635, if it is determined that there has been greater than a threshold period of time in which there has been a consistent match of a subject with the potential subject properties, then the method 600 concludes and returns that a subject has been detected. The threshold period used at step 635 is set at one (1) second. However, other suitable thresholds may be used at step 635. If the threshold period has not been reached at step 635, then the method 600 proceeds to step 655. Step 655 will be described below.

The method 600 does not finish if a single match does not occur. There are a number of reasons the potential subject might not be detected at step 630. The reasons that the potential subject might not be detected at step 630 include the following:

The walking camera operator may temporarily turn the camera 100 and lose the potential subject;
The potential subject can be temporarily obscured by another person or a by a foreground object;
Backgrounds sometimes temporarily match elements of the potential subject. This is more likely to occur in in an arrangement where the low resolution luminance matrix is used as described above.

For the above reasons the decision step 645 is used to prevent immediately leaving method 600 when a single frame is processed without a match to the potential subject. A method similar to decision step 635 is used at step 645 but with a threshold period of time with NO match to the potential subject. When the NO match threshold is exceeded at step 645, it is determined that no subject has been found and the method 600 concludes. A threshold of one (1) second may be used at step 645.

In addition, when a threshold period of time (e.g., three (3) seconds) has been reached since the first time processing occurs at step 605, then it is also determined that no subject has been found. Determining if a threshold period of time has been reached since the first time processing occurs at step 605 prevents remaining within method 600 if conditions such as alternately oscillating between matching and non-matching at decision step 630.

If decision step 645 results in a no match determination then the method 600 completes returning that no subject was found in the method 600. Alternatively, step 655 follows where it is determined whether there are further frames in the input video sequence to be processed and also whether the camera operator is still walking. Either of the methods 500 or 510 described above, or any other suitable method, may be used for determining whether the operator of the camera 100 is walking at step 655.

Following step 655, the method 600 proceeds to decision step 660, where if there are further frames to be processed and the camera operator is still walking, the method 600 will return to step 605. Otherwise, the method 600 completes and returns that no subject was found in the frame received at step 605.

The method 700 of detecting video frames corresponding to the camera operator following a subject, as executed at step 450, is described in more detail below with reference to FIG. 7. The method 700 may be implemented as one or more software code modules of the system program 161 resident in the ROM 160 of the camera 100 and being controlled in its execution by the processor 150 of the camera 100.

The method 700 determines when the period of the camera operator following and capturing the subject ends. The method 700 also marks each of the frames in the determined period to indicate the status of the frames so that the frames can be processed at a later stage. Many of the steps in the method 700 directly correspond to steps of the method 600.

The method 700 begins at step determining step 705, where it is determined whether there are further frames in the input video sequence to be processed and also whether the operator of the camera 100 is still walking. Either of the methods 500 or 510 described above, or any other suitable method, may be used for determining whether the operator of the camera 100 is walking at step 705.

Following step 705, the method 700 proceeds to decision step 710, where if there are further frames to be processed and the camera operator is still walking, then the method 700 proceeds to step 720. Otherwise, the method 700 completes.

Step 720 is similar to the step 625 of the method 600. At step 720, the further frames of the input video sequence are received and processed to determine if there is a match between a subject in the frames and the subject properties determined at step 620. In one arrangement, successive luminance matrices are processed at step 720 as described above in relation to step 625 to determine if there is a matching subject in the frames. In another arrangement, successive frames are processed at step 720 as described above in relation to step 625 to determine if there is a matching subject in the frames. The subject properties that were identified in step 620 of method 600 are again used to determine if there is a matching subject in the frames at step 720. If there is a match of subject properties, then at decision step 730 the method 700 proceeds from step 730 to checking step 750. If there is no matching subject then at decision step 730 the method 700 proceeds to decision step 740.

At step 740, the period of time with NO match with the subject is compared against a threshold. When the threshold is exceeded at step 740, it is determined that the subject is no longer being followed and the method 700 concludes. In contrast to the threshold of one (1) second used at step 625, a longer threshold may be used at step 740. For example, a threshold of 1.5 seconds may be used at step 740. If the threshold is reached at step 740, then the method 700 concludes. If the threshold is not reached at step 740, then the method 700 passes to marking step 770.

At step 750, it is determined if the size of the subject in the frames only varies according to some constraints (i.e., the size of the subject in the frames is consistent). In order to determine if the size of the subject in the frames is consistent, the size of the subject in each of the frames may also be determined at step 750. Size information determined at step 720 may be used in the determination made at step 750.

The subject size is determined based on the areas of the connected low and high luminance blocks of the subject 910 shown in each of the matrices 955, 965 and 975. For example, the subject size may be determined by combining areas of the components of the matching resized template 1025, 1038, and 1045. The area of a matching template is expected to provide less fluctuation than deriving the size directly from the area of the detected connected low and high luminance blocks of the subject 910 due to possible detection errors (lighting conditions, obfuscation, etc.).

Alternatively, the area of a bounding box enclosing the detected dark/light blocks matching a template or the detected blocks can be used.

When the camera operator is following a subject it is expected that the subject size within each frame may change between the successive frame or luminance matrix. However, the size of the subject will remain substantially similar for each frame and there will be no trend over time for the subject to get larger or to get smaller. As such, when the size of the subject remains substantially similar across multiple frames of the captured video and there is no trend over time for the subject to get larger or to get smaller, it may be considered that movements of the camera operator and the subject are substantially synchronised.

If the subject is getting larger over time in each frame it could indicate that a subject walking towards the camera operator or it could indicate the camera operator walking towards a stationary subject that could be a person or a structure such as a monument. If the subject is getting smaller it is likely to indicate that the subject is moving at a faster speed than the camera operator and the subject is not being followed. Whether or not the subject is getting larger or smaller over time, step 750 will output a size inconsistency. Size consistency will now be further described with reference to FIGS. 11A, 11B and 11C.

Figure 11A:
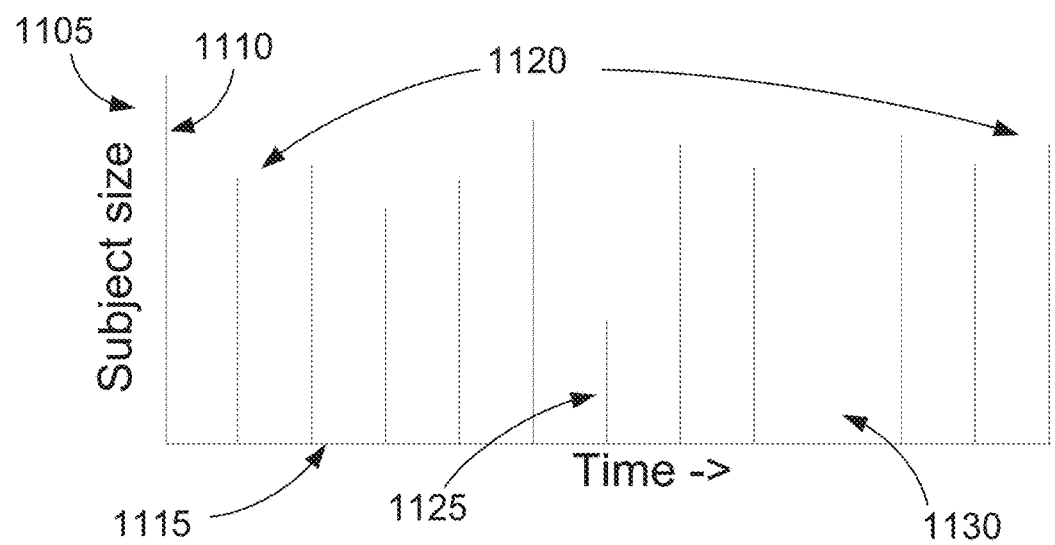
FIG. 11A is a graph showing an example of subject size over time when a camera operator is following a subject.
Figure 11B:
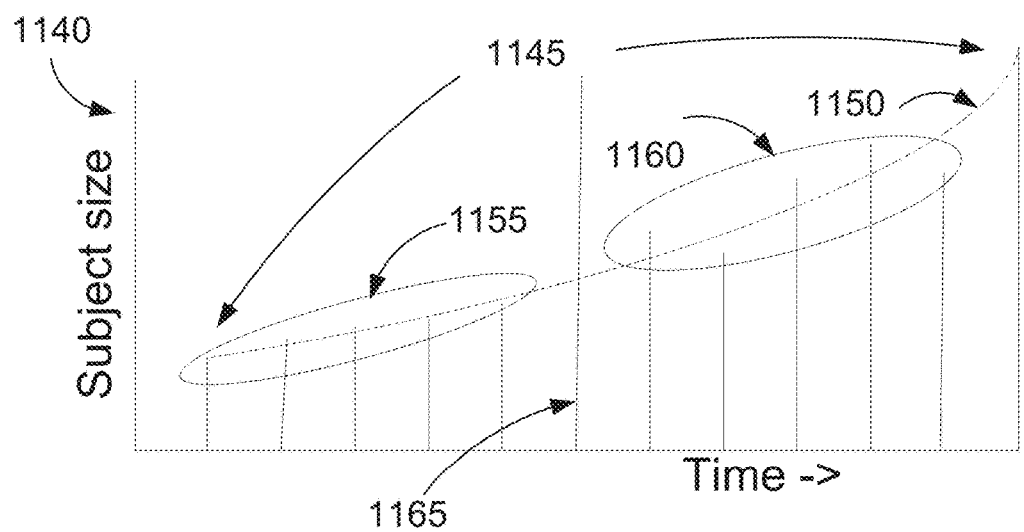
FIG. 11B is a graph showing an example of subject size over time when the camera operator is walking and approaching a subject.
Figure 11C:
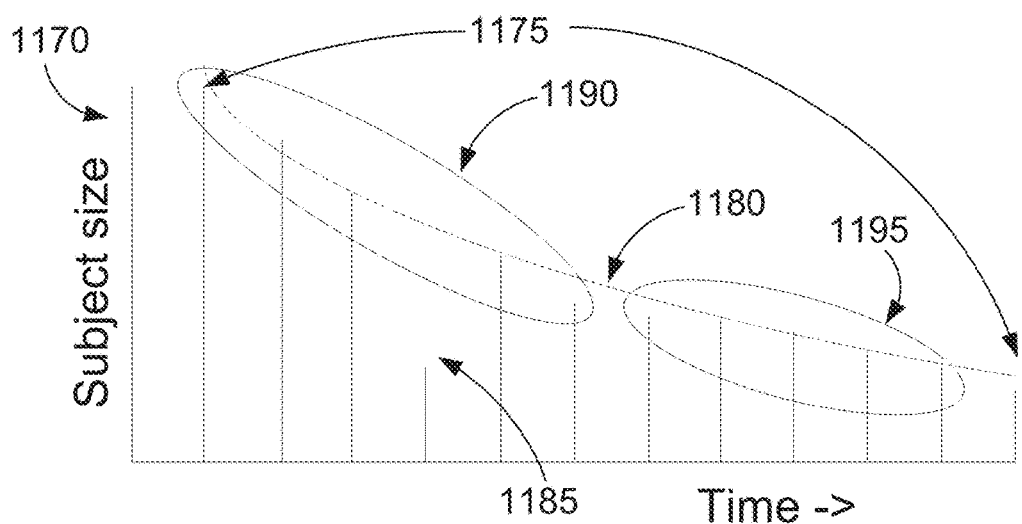
FIG. 11C is a graph showing an example of subject size over time when a subject is getting further away from the camera operator.

As seen in FIG. 11A, graph 1105 is a line graph representing an example of subject size over time graph when the camera operator is following a subject. In FIG. 11B, graph 1140 shows an example subject size and time graph when the operator is walking and approaching a subject. Further, as seen in FIG. 11C, graph 1170 shows an example subject size and time graph when the subject is getting further away from the camera operator. At step 750, the subject relating to graphs 1140 and 1170 may be marked as having an inconsistent size.

The graph 1105 of FIG. 11A comprises a size axis 1110 and time axis 1115. Reference 1120 points to detected size of the subject over successive luminance matrices in one arrangement as described above, and frames in another arrangement as described above. The lines in the graph 1105 represent detected subject size at difference points in time. The variation in the detected subject sizes over time as shown in FIG. 11A is due to the camera operator temporarily walking quicker than the subject or the subject temporarily walking quicker than the camera operator. The size for the subject at reference 1125 is vastly different (i.e., smaller) than the other sizes shown in the graph 1105. One reason for the difference in size occurring over time is when an incorrect object is detected as the subject. Reference 1130 points to a period of time where the subject was temporarily not detected.

In graph 1140, reference 1145 points to the detected size of the subject over time for successive luminance matrices in one arrangement as described above, and frames in another arrangement as described above. In the graph 1140 of FIG. 11B, there is a trend of the subject becoming larger with time indicating that the camera operator is approaching the subject. The subject sizes shown circled and marked as reference 1160 are not consistent with the trend but may be explained by an incorrect object being detected as the subject. A reference line 1150 shown in the graph 1140 is a graph of an inverse function that would match the trend if the camera operator was approaching the subject at a steady pace. One method of determining such a trend is to average the subject size in banks 1155 and 1160 (i.e., the circled subject sizes) and determine there has been a change in the average which is over some threshold. If the subject size remains consistent, or in other words, remains at the same distance from the camera, for a plurality of frames of the captured video sequence, there should be no significant changes in the average (i.e. change would be below a predetermined threshold). As such, if the change in the average is below the predetermined threshold, then the camera operator is determined to be moving towards and with the subject or, in other words, movements of the camera operator and the subject are substantially synchronised.

In both arrangements, the banks 1155 and 1160 may each be two (2) seconds in length. Note that an "outlier" value at 1165 is not considered. Another method of determining a trend in the graph 1140 is to use a moving average.

Equation (2), below, establishes a relationship between the size of the subjects and the change of distance between camera 100 and a subject:

$$\Delta = K(1/S_t - 1/S_{t+1}) \qquad (2)$$

Where $S_t$ is the size at time t and $S_{t+1}$ is the size at a next period, K is some constant and $\Delta$ (delta) represents change in distance between the camera 100 and subject.

Equation (2) may be used to determine the trend seen in graph 1140. As such, if distance between the camera 100 and the subject remains substantially the same for a plurality of frames of the captured video sequence, then the camera operator is determined to be moving towards and with the subject (i.e. movements of the camera operator and the subject are substantially synchronised). The distance between the camera 100 and the subject is determined to be substantially the same if the change in distance, as determined in Equation (2), is about zero consistently across multiple frames of the captures video sequence.

In graph 1170, reference 1175 shows detected size of the subject over successive luminance matrices in one arrangement as described above, and frames in another arrangement as described above. In the graph 1170 of FIG. 11C, there is a trend of the subject becoming smaller with time indicating that the camera operator and subject are separating. The subject size at reference 1185 is not consistent with the trend shown in the graph 1170 but may be explained by an incorrect object being detected as the subject. A reference line 1180 is the graph of an inverse function that would match the trend if the camera operator and subject were separating at a steady pace. One method of determining the trend in the graph 1170 is to average the size in banks shown in FIG. 11C as 1190 and 1195 and determine there has been a change in the average which is over some predetermined threshold. As an example, the banks 1190 and 1195 may each be two (2) seconds in length. Note that "outlier" value at 1185 is not considered as part of the trend shown in the graph 1170.

Following step 750, the method 700 proceeds to step 760, where if the sizes are consist, then the method 700 proceeds to marking step 770. Otherwise, if a size inconsistency is detected at step 750, then the method 700 concludes.

At step 770, the frames read at step 720 are marked as having a followed subject. In one arrangement, the method 700 is practised on frames that have a luminance matrix and so at step 770, the marking may be extrapolated to the sequence of frames that relate to the luminance matrix.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of selecting frames of a video sequence, the method comprising:
   capturing image data for a plurality of consecutive frames of the video sequence using a camera;
   identifying frames from the plurality of consecutive frames where the camera is moving using the captured image data, wherein each of the identified frames comprises a subject;
   determining a size of the subject captured in each of the identified frames; and
   selecting, in a case where the size of the subject within each of a plurality of the identified frames is consistent without becoming larger or smaller with elapse of time, the plurality of the identified frames as frames in which movements of the camera and the subject are synchronized.

2. The method according to claim 1, wherein the size of the subject remains substantially similar for the plurality of the identified frames.

3. The method according to claim 1, further comprising processing the consecutive frames to determine if the camera operator is walking.

4. The method according to claim 1, further comprising determining if an operator of the camera is walking based on video metadata.

5. The method according to claim 4, wherein the metadata is global positioning system metadata.

6. The method according to claim 4, wherein the metadata is accelerometer metadata.

7. The method according to claim 4, further comprising determining if an operator of the camera is walking based on gyro data associated with the camera.

8. The method according to claim 1, further comprising processing a low resolution representation of the identified frames to determine the size of the subject.

9. The method according to claim 8, wherein the low resolution representation is a luminance matrix.

10. The method according to claim 8, wherein the low resolution representation is included in video metadata associated with the frames.

11. The method according to claim 1, further comprising processing pixel data for one or more of the identified frames to determine a size of the subject.

12. The method according to claim 1, further comprising matching a template to the subject to identify the subject.

13. The method according to claim 1, further comprising matching a template to the subject to track changes in size of the subject.

14. The method according to claim 1, wherein the captured image data is pixel data.

15. The method according to claim 1, wherein the captured image data is metadata.

16. The method according to claim 1, wherein the captured image data is pixel data in addition to metadata.

17. The method according to claim 1, wherein a face of the subject is unidentifiable in the frames.

18. An apparatus for selecting frames of a video sequence, the apparatus comprising:
   a memory for storing data and a computer program;
   a processor coupled to the memory for executing the computer program, the program comprising instructions for:
     capturing image data for a plurality of consecutive frames of the video sequence using a camera;
     identifying frames from the plurality of consecutive frames where the camera is moving using the captured image data, wherein each of the identified frames comprises a subject;
     determining a size of the subject captured in each of the identified frames; and
     selecting, in a case where the size of the subject within each of a plurality of the identified frames is consistent without becoming larger or smaller with elapse of time, the plurality of the identified frames as frames in which movements of the camera and the subject are synchronised.

19. A system for selecting frames of a video sequence, the system comprising:
   a memory for storing data and a computer program;
   a processor coupled to the memory for executing computer program, the program comprising instructions for:
     capturing image data for a plurality of consecutive frames of the video sequence using a camera;
     identifying frames from the plurality of consecutive frames where the camera is moving using the captured image data, wherein each of the identified frames comprises a subject;
     determining a size of the subject captured in each of the identified frames; and
     selecting, in a case where the size of the subject within each of a plurality of the identified frames is consistent without becoming larger or smaller with elapse of time, the plurality of the identified frames as frames in which movements of the camera and the subject are synchronised.

20. A non-transitory computer readable storage medium having a program for selecting frames of a video sequence, the program comprising:
   code for capturing image data for a plurality of consecutive frames of the video sequence using a camera;
   code for identifying frames from the plurality of consecutive frames where the camera is moving using the captured image data, wherein each of the identified frames comprises a subject;
   code for determining a size of the subject captured in each of the identified frames; and
   code for selecting, in a case where the size of the subject within each of a plurality of the identified frames is consistent without becoming larger or smaller with elapse of time, the plurality of the identified frames as frames in which movements of the camera and the subject are synchronised.

* * * * *